United States Patent [19]

Powell

[11] 4,193,437
[45] Mar. 18, 1980

[54] SELF SUPPORTING TIRE

[75] Inventor: Joe A. Powell, Norton, Ohio

[73] Assignee: The B. F. Goodrich Company, Akron, Ohio

[21] Appl. No.: 833,789

[22] Filed: Sep. 16, 1977

[51] Int. Cl.$^2$ .............. B06C 17/00; C08L 7/00; C08L 9/00; C08L 9/06

[52] U.S. Cl. .............. 152/330 RF; 152/330 R; 152/353 R; 260/5; 260/42.32; 260/42.47; 525/1; 525/232

[58] Field of Search .............. 260/5, 894, 42.32, 42.47; 152/353 R, 330 R, 330 RF

[56] References Cited

U.S. PATENT DOCUMENTS

| | | | |
|---|---|---|---|
| 3,638,702 | 2/1972 | Endter | 260/5 |
| 3,872,036 | 3/1975 | Todani et al. | 260/894 |
| 3,934,634 | 1/1976 | Verdier | 152/354 |
| 3,938,574 | 2/1976 | Burmester et al. | 260/5 |
| 3,949,798 | 4/1976 | Gardner et al. | 152/354 |
| 3,954,131 | 5/1976 | Hoshino et al. | 152/354 |
| 3,983,918 | 10/1976 | French | 152/353 R |
| 4,082,706 | 4/1978 | Danielson | 260/5 |

FOREIGN PATENT DOCUMENTS 717572 9/1965 Canada .............. 260/5

*Primary Examiner*—Allan Lieberman
*Attorney, Agent, or Firm*—Joe Allen Powell

[57] ABSTRACT

A self supporting tire having a nonstaining high modulus low hysteresis inner sidewall composition comprising: (a) 100 parts by weight of sulfur vulcanizable rubber of which from about 50 to about 95 parts by weight is natural rubber and/or cis-polyisoprene and from about 5 to about 50 parts by weight is at least one elastomer selected from the group consisting of styrene-butadiene and cis-polybutadiene; and (b) from about 25 to about 80 parts by weight of carbon black per 100 parts by weight of rubber, wherein said carbon black has a dibutyl phthalate absorption value greater than about 80 and a particle size less than about 50 millimicrons. The self supporting tire is capable of operating both as a pneumatic tire under ordinary inflated conditions and also has the capability of operating without inflation for limited distance.

12 Claims, 1 Drawing Figure

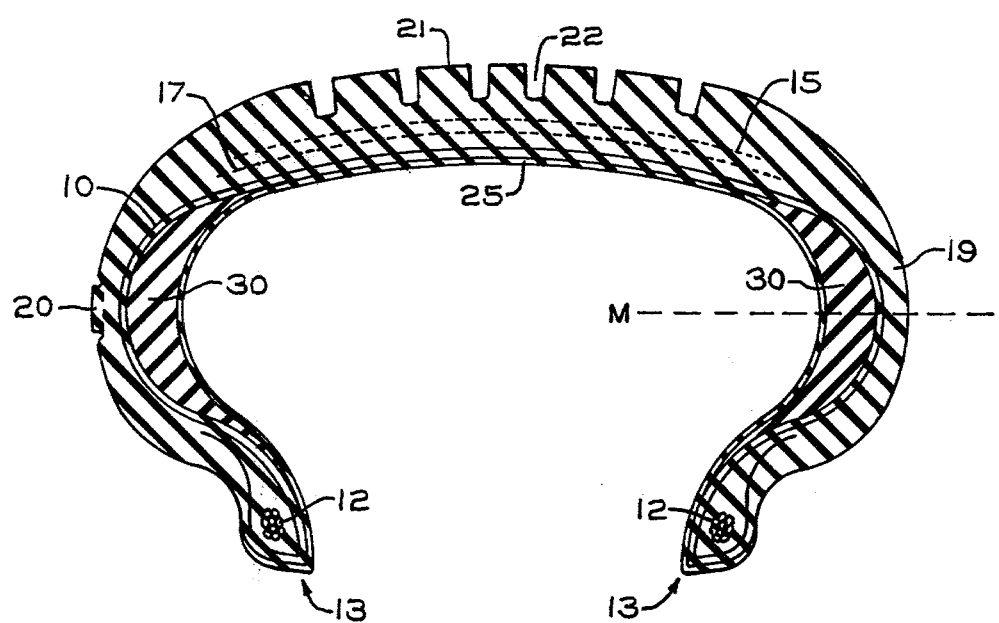

SELF SUPPORTING TIRE

BACKGROUND OF THE INVENTION

A pneumatic tire has historically been sought which has a reliable means of supporting the load of a vehicle upon the loss of the tire's inflation gas. Such a tire would allow the motorist to continue operating his vehicle for a limited distance before being required to change the tire. A tire having this "run-flat" feature would reduce the frequency of tire changes on high speed highways, thereby resulting in increased safety for the motoring public. Many devices have been proposed which will prevent the collapse of the tire upon its deflation. These devices are usually nonintegral with the tire and therefore difficult to mount, cumbersome, and generally not completely successful.

A more desirable approach to obtain a tire which will operate over short distances without the support of inflation gas is to construct the tire such that it will be self-supporting. The self supporting feature is achieved by employing relatively thick rubber reinforcement inward of the carcass ply in the middle sidewall area of the tire. The rubber reinforcement prevents the tire from collapsing completely and thus provides a limited driving range or run-flat capability after the loss of inflation.

U.S. Pat. Nos. 3,983,918 and 3,954,131 disclose tires having this inner sidewall reinforcement.

A requirement for successful performance of such a tire, both in the presence and absence of inflation gas, is that the inner sidewall material, which undergoes the most severe deflection, be made of an elastomeric material having a high modulus of elasticity and a low hysteresis. Natural rubber compositions have traditionally been preferred for applications requiring high modulus and low hysteresis. However, natural rubber, after prolonged exposure to heat, undergoes reversion, which means that the initial stiff high-modulus vulcanized material gradually softens and exhibits lower and lower modulus values approaching that of the original unvulcanized crude rubber, which ultimately are too low for satisfactory support of the weight by an uninflated tire. To prevent reversion of the natural rubber compound, large quantities of highly active antioxidants are used. These antioxidants, although effective, present other problems. The most effective antioxidants are staining and if a compound containing staining antioxidants is placed next to a white rubber compound, the antioxidant will migrate to the white rubber and cause discoloration. Since the inner sidewall compound is located directly under the white area of a white sidewall tire, staining is a serious problem. It is desirable to have a tire which will operate with and without inflation gas and not stain the white sidewall.

SUMMARY OF THE INVENTION

It is an object of the present invention to provide a self supporting tire which has the capability of operating both with and without inflation gas.

It is a further object of the present invention to provide a self supporting tire which has an integral inner sidewall composition that will not discolor the white sidewall of the tire.

These and other objects, which will become evident from the subsequent description, are achieved by employing as an inner sidewall an elastomeric composition comprising: (a) 100 parts by weight of sulfur vulcanizable rubber of which from about 50 to about 95 parts by weight is natural rubber and/or cis-polyisoprene and from about 5 to about 50 parts by weight is at least one elastomer selected from the group consisting of styrene-butadiene and cis-polybutadiene; (b) from about 25 to about 80 parts by weight of carbon black per 100 parts by weight of rubber, wherein said carbon black has a dibutyl phthalate absorption value greater than about 80 and a particle size less than about 50 milli-microns; and sufficient curing agents to effect vulcanization. Said inner sidewall being further characterized as having a 300% modulus of at least 1800 psi., a hardness of at least 60 Shore A durometer and a heat build-up value less than about 60° F. as measured by the Goodrich Flexometer.

BRIEF DESCRIPTION OF THE DRAWING

The accompanying drawing shows a cross section of a tire of this invention which has the capability of running with or without inflation gas and also has an inner sidewall rubber composition which will not discolor the white sidewall rubber.

DETAILED DESCRIPTION

This invention can be used in any type of pneumatic tire in which the weight of the vehicle is borne entirely on the sidewalls without total collapse of the tire such that the inner surface of the tire contacts itself, but is particularly intended to be used in radial passenger car pneumatic tires.

Pneumatic tires generally consist of a flexible cord carcass or body to resist the pressure of the inflation gas, terminated at each side edge by a bead which engages the rim of a wheel. The cords are embedded in rubber, and are protected from abrasion by tread and sidewall rubber, and are made to hold air by preferably having an integral, essentially impervious liner on the interior of the carcass.

In the drawing, which illustrates the presently preferred embodiment, the invention is shown as embodied in a passenger vehicle tire that comprises at least one ply 10 of carcass cords. These cords may be high-tenacity rayon, polyester, nylon, aromatic polyamide or steel cords, and the like, i.e. with the individually rubberized cords essentially in radial planes. The edges of the ply or plies are suitably wrapped around inextensible bead grommets 12 forming part of molded beads 13 shaped for engagement with a standard rim.

The radial cord ply 10 in the crown of the tire, which is the region capable of engaging the road, is surrounded by a circumferential belt, which in this instance is shown as consisting of two strips or plies 15 and 17 of steel cords but could be of other low-extensible material such as aromatic polyamide fibers also known as arimid fibers. More than two plies of low-extensible material may be used to form the circumferential belt if greater stiffness is desired. The steel cord belt plies 15 and 17 are preferably prepared with the cords in each ply parallel to each other and at an angle to the circumferential central plane of the tire, the cords in one ply extending in a direction opposite to the cords in the other ply. This angle in the finished tire may be about 15° to 30° relative to the circumferential central plane. The two crown plies form an essentially inextensible belt around the radial cord ply.

A protective layer of rubber completely surrounds the tire outwardly of the reinforcing carcass. This is preferably composed of a moderate thickness of black sidewall rubber 19 in the zones where intense flexing occurs. At least one sidewall of the tire may have an outer layer of white sidewall rubber 20. The crown of the tire has a thick layer of tread rubber 21 for resisting road wear. The tread layer has a suitable nonskid pattern 22 of slits, slots, grooves and the like as is well understood in the art.

On the inner face of the tire is a liner 25 composed of a rubber material having resistance to diffusion of air such as butyl rubber, or halogenated butyl rubber, and/or blends thereof. This liner extends from one bead 13 to the other bead so as to seal against the rim and minimize the loss of inflation gas or its penetration into the body of the tire.

In accordance with this invention, the improved tire has, in addition to the features just described which were known before this invention, an integral layer of inner sidewall rubber 30 disposed outwardly of the liner 25 and inwardly of the carcass ply 10. The layer of inner sidewall rubber 30 extends from just above the bead area 13 to just beyond the edges of belt plies 15 and 17 at the outside edges of the tread 21. The inner sidewall layer 30 is profiled such that its maximum thickness is in the mid-sidewall region M of the tire where intense compression occurs in the uninflated state. The inner sidewall layer 30 gradually decreases in thickness as it extends from either side of the mid-sidewall region M and terminates as a thin edge at a point just above the bead area 13 and at a point just beyond the edges of belt plies 15 and 17.

In order for the tire to be self supporting, the inner sidewall compound 30, must have a 300% modulus (tensile stress at 300% elongation) of at least 1800 psi and preferably at least 2200 psi as measured by ASTM D412. The inner sidewall compound must also be a low hysteresis composition, that is it must have a heat build-up value less than 60° F. and preferably less than 50° F., as measured by the Goodrich Flexometer at a 0.225 inch stroke and 195° F. according to ASTM Test D623 Method A. A low hysteresis composition is required to minimize the excessive heat generated while the tire is running in a deflated condition. The inner sidewall compound should have a hardness of at least 60 and preferably at least 65 Shore A durometer as measured according to ASTM D2240.

Since on one side of the tire, the inner sidewall layer 30 is located under the white sidewall rubber 20, the composition of the inner sidewall must be nonstaining. Materials which cause a rubber compound to be staining are normally staining oils and certain antioxidants and antiozonants. If present in a rubber compound, these staining ingredients will migrate to adjacent layers of rubber and cause discoloration.

A natural rubber composition because of its initial high modulus and low hysteresis properties is ideal for meeting the above physical properties when first vulcanized. However, with aging and especially under severe heat such as is present when a self supporting tire is running without inflation, natural rubber undergoes reversion which results in lower modulus and softness, which ultimately are too low for satisfactory support of an uninflated tire. To protect an all natural rubber composition from reversion, highly efficient antioxidants, such as those disclosed in U.S. Pat. No. 3,983,919 are normally used. These antioxidants are staining which results in a discoloration of adjacent white rubber compounds.

Quite unexpectedly, I have found that a self supporting tire can be made having an inner sidewall which meets the physical property requirements and also is nonstaining. The novel inner sidewall composition of this invention comprises: (a) 100 parts by weight of sulfur vulcanizable rubbers of which from about 50 to about 95 parts by weight is natural rubber and/or cis-polyisoprene and from about 5 to about 50 parts by weight is at least one elastomer selected from the group consisting of styrene butadiene and cis-polybutadiene; and (b) from about 25 to about 80 parts by weight of carbon black per 100 parts by weight of rubber, wherein said carbon black has a dibutyl phthalate absorption value greater than about 80 and a particle size less than about 50 milli-microns.

In the inner sidewall composition, natural rubber and/or cis-polyisoprene is used at a level of from about 50 to about 95 parts by weight and preferably from about 70 to about 85 parts by weight. Synthetic cis-polyisoprene is chemically identical with natural rubber and the two can be interchanged with each other or blends of the two can be used. For processing and building tack, natural rubber is normally preferred over synthetic cis-polyisoprene.

The remainder of the rubber component of the inner sidewall composition contains from about 5 to about 50 parts by weight, preferably from about 15 to about 30 parts by weight, of at least one elastomer selected from the group consisting of styrene-butadiene and cis-polybutadiene. The styrene-butadiene and/or cis-polybutadiene elastomer is necessary to maintain the modulus and hardness levels of the original vulcanizate.

With severe heat aging, as occurs in the inner sidewall during tire operation without inflation, natural rubber alone would revert and become soft and exhibit lower modulus and therefore be unable to support the tire. Styrene-butadiene and/or cis-polybutadiene rubber alone would become hard and brittle with aging and therefore would be unsuitable for use as an inner sidewall compound. By blending the styrene-butadiene and/or cis-polybutadiene with natural rubber, the reversion problem associated with natural rubber is overcome and therefore the need for staining antioxidants is eliminated.

In addition to the elastomers, the inner sidewall composition contains from about 25 to about 80 parts by weight, preferably from about 35 to about 50 parts by weight of carbon black per 100 parts by weight of rubber. It is necessary to use a carbon black which has a high dibutyl phthalate absorption value and a small particle size in order to achieve the desired high modulus with a low heat build-up value. The carbon black used must have a dibutyl phthalate absorption value greater than 80, preferably greater than 120, and a particle size less than about 50 milli-microns, and preferably less than 30 milli-microns. Dibutyl phthalate (DBP) absorption value is measured by the method specified in ASTM D2414. The DBP absorption values are usually reported in cubic centimeter of DBP absorped per 100 grams of carbon black. The DBP absorption value of a carbon black is a function of its particle size and its structure. The smaller the particle size for a given structure, the higher the DBP absorption value and the higher the structure for a given particle size, the higher the DBP absorption value. Carbon blacks with high structure and small particle size produce a desirably high modulus without undue increase in hysteresis. One or a blend of more than one carbon black may be mixed with the elastomer. Examples of suitable carbon blacks for use in this invention are those with ASTM designation N110, N234, N303, N339, N351, N358 and the like.

Ingredients which have a softening effect on the composition are normally avoided. Such ingredients are oils, fatty acids, fusible resins and the like. In some circumstances, it may be necessary to use small quantities of not greater than 5 parts by weight and preferably not greater than 3 parts by weight per 100 parts by weight of rubber softeners to facilitate processing. Softeners tend to lower the necessary high modulus of the inner sidewall composition.

The inner sidewall composition of this invention is vulcanized using conventional vulcanizing agents. Because of their excellent heat aging characteristics, sulfurless or low sulfur cure systems are preferred. A particularly desirable cure system is one employing 1.5 parts sulfur, 2 parts of dithio dimorpholine, and 1.15 parts of cyclohexyl benzothiazyl sulfenamide. Another suitable cure system is one employing 1.5 parts sulfur and 2.5 parts of cyclohexyl benzothiazyl sulfenamide. Said parts are expressed as parts by weight per 100 parts by weight of rubber. Activators such as zinc oxide are also used in the composition. Zinc oxide is also beneficial in heat aging prevention. Small quantities of resorcinol and hexamethylene tetramine, which form a heat setting phenolic resin are advantageous in the composition. The resin formed tends to increase modulus while decreasing the detrimental effects of heat aging, which is a very desirable feature.

Cobalt compounds such as cobalt stearate, cobalt naphthenate and the like, are beneficial in the inner sidewall composition because they tend to induce cross linking of the rubber. Cobalt stearate was found to be particularly desirable because it melts during processing thereby providing a lubricating effect on the compound and eliminating the need for using softeners.

Staining oils and staining antioxidants such as diphenyl-phenylenediamine, diphenylamine, dimethyl butylphenyl p-phenylene diamine and the like must be avoided. These ingredients will cause discoloration in the adjacent white rubber compound.

The inner sidewall composition as described above performs very well in a self supporting tire both in the inflated and uninflated condition. The unique properties of high modulus, low hysteresis and nonstaining allow a self supporting tire to be made with a white sidewall which will not discolor.

The inner sidewall composition is prepared by mixing the ingredients in conventional mixing equipment such as Banbury mixers, mills, continuous mixers and the like. Standard mixing procedures are used which is normally to mix the rubber, carbon black, zinc oxide and other nonvulcanizing ingredients together first and then, as the last step in the mixing, the vulcanizing agents are added.

The desired shape and size of the inner sidewall is preferably obtained by extruding through a die of the desired size and shape. The thickness of the inner sidewall will vary depending on the size of the tire and the load the tire is designed to support. For a typical passenger car tire, a thickness of from about 0.3 to about 0.6 inch is preferred.

Self supporting tires of this invention can be manufactured with ordinary equipment without alteration, and with only a slight increase in raw materials and labor costs. The principal change from ordinary practice is to place a pair of inner sidewalls in the sidewall area between the impervious liner and the carcass ply. The remainder of the tire is built onto the drum as in a conventional tire. Once the tire is built, it is vulcanized in a press using standard tire curing procedures and conditions which are well known in the art.

In order to further illustrate the present invention, the following example is presented.

EXAMPLE

This example is presented to show that the run-flat performance of a self supporting tire can be dramatically improved by using as an inner sidewall a composition containing a rubber mixture of 80/20 natural rubber/styrene-butadiene versus a composition containing an all natural rubber formulation. The compositions used are shown in Table I. Both compositions are nonstaining in order to enable their use in a tire having a white sidewall. Formulation 1 is an all natural rubber formulation while formulation 2 is an 80/20 natural rubber/styrene-butadiene formulation.

TABLE I

| Ingredient (Parts by Weight) | Formulation 1 | Formulation 2 |
| --- | --- | --- |
| Natural Rubber | 100 | 80 |
| Styrene-Butadiene | — | 20 |
| ASTM N358 Carbon Black | 40 | 40 |
| Zinc Oxide | 10 | 10 |
| Cobalt Stearate | 6 | 6 |
| Peptizer | 0.25 | 0.25 |
| Resorcinol | 1.50 | 1.50 |
| Hexamethylene Tetramine | 2.10 | 2.10 |
| Methylene Bis Methylbutyl Phenol | 2.00 | 2.00 |
| Sulfur | 1.50 | 1.50 |
| Dithio Dimorpholine | 2.00 | 2.00 |
| Cyclohexyl Benzothiazyl Sulfenamide | 1.15 | 1.15 |
| Retarder | 0.30 | 0.30 |

Two tires were made with each of the above formulations as the inner sidewall in a self supporting GR78-15 radial passenger tire. The four tires were built using standard radial tire building equipment and procedures and then molded in a press for about 21 minutes at a temperature of 350° F. and an internal pressure of 400 psig. The tires were tested by mounting on a conventional rim and placed on the right rear position of an automobile. After placing on the automobile, the valve core was removed from the valve so as to allow all the internal pressure to escape. The tires were run at a speed of 25 mph and a load of 1380 pounds until failure. The mileage to failure was determined as the point where the tire would no longer support the 1380 pound load as evidenced by the complete collapse of the tire such that the sidewall developes severe folds as it goes through the road contacting area. The run flat mileage and the physical properties of the two formulations are shown in Table II.

TABLE II

| Test | Formulation 1 | Formulation 2 |
| --- | --- | --- |
| Tensile Strength (psi) | 3600 | 3650 |
| 300% Modulus (psi) | 2600 | 2600 |
| Elongation (%) | 405 | 405 |
| Durometer (Shore A) | 70 | 71 |
| Goodrich Flexometer Heat Build-up (°F.) | 36 | 36 |
| Run Flat Mileage (Ave. of 2 Tires) | 26.95 | 66.85 |

The data in Table II shows that although the initial physical properties of the two formulations are almost identical, the self supporting tires having an inner sidewall of formulation 2 have dramatically improved run flat performance. Quite unexpectedly, the tires having an inner sidewall of the 80/20 natural rubber/styrene-butadiene formulation have almost a two and one-half fold increase in run flat mileage over the all natural rubber formulation.

Tires employing this invention are useful on any vehicle where pneumatic tires are now used. Because of the added safety associated with tires of this invention, they are particularly suited for use on passenger cars.

Although this invention has been illustrated, by way of example, with an inner sidewall compound containing 20 parts by weight of styrene-butadiene and 80 parts by weight of natural rubber, the ratio of rubbers may vary from 5 parts by weight styrene-butadiene and 95 parts by weight of natural rubber to 50 parts by weight of styrene-butadiene and 50 parts by weight of natural rubber. It is preferred that natural rubber be present at a level of from about 70 parts by weight to about 85 parts by weight per 100 parts by weight of rubber.

Cis-polybutadiene may be substituted on an equal part basis for styrene-butadiene in this invention or blends of cis-polybutadiene and styrene-butadiene rubbers may be used as long as at least 50 parts by weight of the rubber consists of natural rubber and/or cis-polyisoprene.

Cis-polyisoprene, the synthetic duplicate of natural rubber, may be substituted or blended with natural rubber in this invention. As is well known by those skilled in the art, it is sometimes desirable to blend rubbers together to achieve better processing characteristics depending on the particular type of equipment and conditions used.

The composition in the above example used N358 carbon black. Other carbon blacks may be substituted for N358 or blends of more than one carbon black may be used. The important criterion is that the carbon black used must have a dibutyl phthalate absorption value greater than 80 and a particle size less than about 50 milli-microns.

The cure system shown in the example is a preferred cure system for achieving vulcanization. There are many different combinations of curing agents which will become apparent to those skilled in the art.

In practicing this invention, those skilled in the art may make minor variations in the disclosed novel composition in order to facilitate processing on their particular equipment. Therefore, it is intended that the scope of this invention be limited only by the following claims.

I claim:

1. In a self supporting tire comprising two spaced inextensible beads, a ground contacting tread portion, a pair of individual sidewalls extending radially inward from the axial outer edges of said tread portion to join the respective beads, a carcass portion, and a pair of integral inner sidewalls disposed inwardly of said carcass portion and extending radially outward from a point near said beads to a point beyond the axial outer edges of said tread, the improvement consisting in the inner sidewall being formed of a nonstaining composition comprising:
   (a) from about 50 to about 95 parts by weight of at least one elastomer selected from the group consisting of natural rubber and cis-polyisoprene,
   (b) from about 5 to about 50 parts by weight of at least one elastomer selected from the group consisting of styrene-butadiene and cis-polybutadiene,
   (c) from about 25 to about 80 parts by weight of carbon black per 100 parts by weight of rubber, wherein said carbon black has a dibutyl phthalate absorption value greater than about 80 and a particle size less than about 50 milli-microns, and
   (d) sufficient curing agents to effect vulcanization; wherein said inner sidewall composition when vulcanized has a 300% modulus of at least 1800 psi, a hardness of at least 60 Shore A durometer, and a heat buildup value less than about 60° F. as measured by the Goodrich Flexometer.

2. A tire of claim 1 wherein said inner sidewall has a 300% modulus of at least 2200 psi and a hardness of at least 65 Shore A durometer.

3. A tire of claim 2 wherein the inner sidewall composition comprises:
   (a) from about 70 to about 85 parts by weight of at least one elastomer selected from the group consisting of natural rubber and cis-polyisoprene,
   (b) from about 15 to about 30 parts by weight of at least one elastomer selected from the group consisting of styrene-butadiene and cis-polybutadiene, and
   (c) from about 35 to about 50 parts by weight of carbon black per 100 parts by weight of rubber, wherein said carbon black has a dibutyl phthalate absorption value greater than about 80 and a particle size less than about 50 milli-microns.

4. A tire of claim 3 wherein said carbon black has a dibutyl phthalate absorption value greater than about 120 and a particle size less than about 30 milli-microns.

5. A tire of claim 4 wherein said inner sidewall contains a cobalt compound selected from the group consisting of cobalt stearate and cobalt naphthenate.

6. A tire of claim 5 wherein said inner sidewall contains a heat setting phenolic resin formed by the reaction of resorcinol and hexamethylene tetramine.

7. A tire of claim 6 wherein the elastomer portion of said inner sidewall composition consists of natural rubber and styrene-butadiene.

8. A tire of claim 7 wherein said inner sidewall has a maximum thickness of from about 0.3 to about 0.6 inch.

9. In a self supporting tire comprising two spaced inextensible beads, a ground contacting tread portion, a pair of individual sidewalls extending radially inward from the axial outer edges of said tread portion to join the respective beads, a carcass portion having at least one ply of rubberized cords lying essentially in radial planes wherein said cords are wrapped around said beads, a circumferential belt comprising at least two plies of low extensible cords with the cords in each ply parallel to each other and at an angle to the circumferential central plane of the tire and with the cords in one ply extending in a direction opposite to the cords in the other ply, and a pair of integral inner sidewalls disposed inwardly of said carcass portion and extending radially outward from a point near said beads to a point beyond the axial outer edges of said tread, the improvement consisting in the inner sidewall being formed of a nonstaining composition comprising:
   (a) from about 50 to about 95 parts by weight of at least one elastomer selected from the group consisting of natural rubber and cis-polyisoprene, (b) from about 5 to about 50 parts by weight of at least one elastomer selected from the group consisting of styrene-butadiene and cis-polybutadiene, (c) from about 25 to about 80 parts by weight of carbon black per 100 parts by weight of rubber, wherein said carbon black has a dibutyl phthalate absorption value greater than about 80 and a particle size less than about 50 milli-microns, and (d) sufficient curing agents to effect vulcanization; wherein said inner sidewall composition when vulcanized has a 300% modulus of at least 1800 psi, a hardness of at least 60 Shore A durometer, and a heat buildup value less than about 60° F. as measured by the Goodrich Flexometer.

10. A tire of claim 9 wherein said inner sidewall has a 300% modulus of at least 2200 psi and a hardness of at least 65 Shore A durometer.

11. A tire of claim 10 wherein the inner sidewall composition comprises:
(a) from about 70 to about 85 parts by weight of at least one elastomer selected from the group consisting of natural rubber and cis-polyisoprene,
(b) from about 15 to about 30 parts by weight of at least one elastomer selected from the group consisting of styrene-butadiene and cis-polybutadiene, and
(c) from about 35 to about 50 parts by weight of carbon black per 100 parts by weight of rubber, wherein said carbon black has a dibutyl phthalate absorption value greater than about 80 and a particle size less than about 50 milli-microns.

12. A tire of claim 11 wherein said carbon black has a dibutyl phthalate absorption value greater than about 120 and a particle size less than about 30 milli-microns.

* * * * *